Feb. 14, 1939.  J. P. KRIECHBAUM  2,147,604
HEATING SYSTEM
Filed April 15, 1935
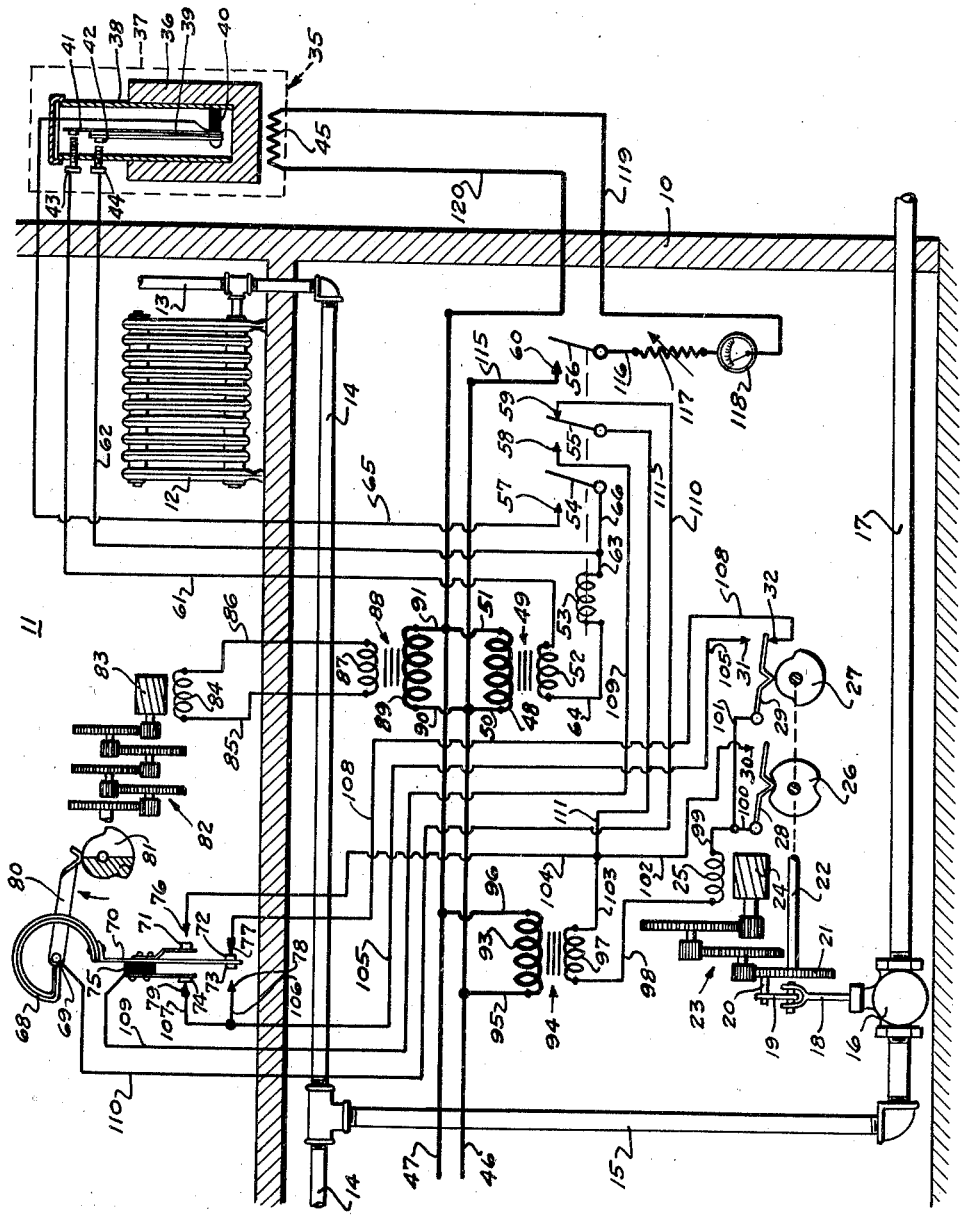
INVENTOR
John P. Kriechbaum
BY HIS ATTORNEY
George H. Fisher Patented Feb. 14, 1939

2,147,604

UNITED STATES PATENT OFFICE 2,147,604

HEATING SYSTEM

John P. Kriechbaum, Minneapolis, Minn., assignor to Minneapolis-Honeywell Regulator Company, Minneapolis, Minn., a corporation of Delaware Application April 15, 1935, Serial No. 16,275

9 Claims. (Cl. 236—46)

This invention relates to heating systems of the type disclosed in the patent to Daniel G. Taylor, No. 2,065,835, dated December 29, 1936.

The system disclosed in the above referred to Taylor application comprises an outdoor controller responsive to outdoor atmospheric conditions including temperature, wind and sun for controlling the temperature within the building. Heating means are provided in the building for supplying heat to the building and heating means are also provided in the outdoor controller for supplying heat to the outdoor controller. The two heating means are proportioned according to the heat losses from the building and from the outdoor controller. A thermostatic device is provided for responding to the temperature within the outdoor controller and when this thermostatic device calls for heat both of the heating means are energized to deliver heat to the building and to the outside controller. Due to the proportional relationship of the heating means with the heat losses of the building and the outside controller, a definite temperature relation is maintained within the building and the outside controller, so that by responding to the temperature of the outside controller the thermostatic device maintains a constant or normal temperature within the building.

Such a system gives excellent results when the system is maintained in operation for twenty-four hours a day. However, it is often desirable to shut down the heating system during the night to lower the temperature within the building to conserve on fuel costs. But due to the fundamental theory of operation the system of the Taylor application cannot supply sufficient heat to the building in the morning after a night shut down to rapidly raise the temperature to normal and thereafter maintain the temperature in the building at normal. This is caused by the fact that only sufficient heat is supplied to the building to maintain the temperature thereof constant according to variations in outside atmospheric conditions. In order to successfully operate the system of the type disclosed in the above referred to Taylor application where it is desired to have a night shut down, it is necessary that some independent means be provided for raising the temperature in the building to normal after a night shut down.

Therefore, it is an object of this invention to provide a morning pick-up control of the heating system whereby the building temperature is brought up to normal so that the temperature of the building may be maintained at normal by the outdoor controller.

Another object is to provide a means for controlling the temperature in a building during the daytime according to variations in outside weather conditions and to provide means for night control at a lowered temperature in response to temperatures existing within the building.

Another object is to provide a night control for a building to maintain the building at temperature during the night, to provide for raising the temperature in the morning up to normal and to provide for controlling the temperature of the building during the daytime according to outside weather conditions.

A further object is to provide a single thermostatic means responsive to the temperatures within the building for maintaining a given night temperature within the building, for raising the temperature within the building to the normal day value in the morning and to automatically shift the control of the heating system from the single thermostatic means to the outdoor controller whereby the temperature within the building is maintained substantially constant throughout the day by the outdoor controller.

Another object is to provide a thermostatic means responsive to a given range of temperatures within the building to permit the outdoor controller to control the operation of the building heating means and responsive to temperatures outside of the given range for directly controlling the building heating means regardless of the condition of the outside control.

Still another object of this invention is to provide an adjustable thermostatic means which maintains a given night temperature within the building, which raises the temperature of the building from the night value to the normal day value in the morning, which permits an outdoor controller to control the building heating means to maintain a substantially constant temperature within the building during the daytime and which operates as a high limit and a low limit control to maintain the temperature of the building within predetermined limits during the daytime.

Other objects and advantages will become apparent to those skilled in the art by referring to the accompanying specification, claims and drawing in which drawing is diagrammatically shown the preferred form of my invention.

The temperature changing system of my invention is shown applied to a building having a side wall 10 and a plurality of rooms or spaces to be heated, one of which is shown at 11. Located in each room or space to be heated 11, is a radiator 12, receiving its supply of heating fluid, such as steam, from a riser 13. The riser 13 connects to a header 14 which in turn receives its heating fluid supply from a pipe 15. Heating fluid is supplied from some source, not shown, such as a central heating system or a constantly energized boiler through a pipe 17 to the pipe 15. The supply of heating fluid from the supply pipe 17 and into the pipe 15 and hence into the heating system of the building, is controlled by means of a valve 16. When the valve 16 is opened, heating fluid is supplied to the radiators 12 in the spaces to be heated and when the valve 16 is closed, heating fluid is prevented from entering the radiators 12.

The valve 16 is operated by a valve stem 18 which is connected to a pitman 19, mounted on a crank pin 20. A gear 21 mounted on a shaft 22 carries the crank pin 20. The gear 21 is driven through a reduction gear train 23 by a motor rotor 24 upon energization of a motor field 25. Mounted on the shaft 22 for rotation therewith are cams 26 and 27 which operate contact arms 28 and 29, respectively. The high dwells of the cam 26 are adapted to move the contact arm 28 into engagement with a contact 30. The high dwell of the cam 27 is adapted to move the contact arm 29 into engagement with the contact 31 and the low dwell of the cam 27 permits the contact arm 29 to move into engagement with the contact 32.

Located outside of the building and responsive to atmospheric conditions such as temperature, wind and solar radiation, is an outdoor controller 35. The outdoor controller 35 comprises a metallic block 36 which is enclosed within a weather-tight casing 37. The block 36 is hollowed out to receive a container 38 in which is mounted a bimetallic element 39 by means of a post 40. The bimetallic element 39 responds to changes in temperature in the block 36. The bimetallic element 39 carries contacts 41 and 42 which are adapted to sequentially engage adjustable contacts 43 and 44. The outdoor controller 35 is also provided with a heater 45, which when energized, heats the block 36. The block is cooled by the outdoor atmospheric conditions.

Line wires leading from some source of power not shown are designated at 46 and 47. A primary 48 of a step-down transformer 49 is connected to the line wires 46 and 47 by means of wires 50 and 51, respectively. The transformer 49 is provided with a secondary 52. A relay coil 53 controls the operation of switch arms 54, 55 and 56. Upon energization of the relay coil 53, the switch arms 54, 55 and 56 are moved into engagement with contacts 57, 58 and 60. Upon deenergization of the relay coil 53 the switch arms 54, 55 and 56 are moved out of engagement with contacts 57, 58 and 60 and the switch arm 55 is moved into engagement with a contact 59 by means of springs or gravity of some other means, not shown.

One end of the secondary 52 of the step-down transformer 49 is connected by means of a wire 61 to the adjustable contact 43. The other adjustable contact 44 is connected by wire 62 and a wire 63 to one end of the relay coil 53. The other end of the relay coil 53 is connected by means of a wire 64 to the other end of the secondary 52. The post 40 of the outdoor controller 35 is connected by means of a wire 65 to the contact 57. The switch arm 54 is connected by means of a wire 66 to the junction of wires 62 and 63.

When the temperature of the block 36 decreases below a predetermined value, contact 41 engages contact 43 and upon a further decrease in temperature, contact 42 engages contact 44 to complete a circuit from the secondary 52 through wire 61, contacts 43, 41, 42 and 44, wires 62 and 63, relay coil 53 and wire 64 back to the secondary 52. Completion of this circuit causes the switch arms 54, 55 and 56 to move into engagement with the contacts 57, 58 and 60. When the switch arm 54 engages the contact 57, a second or holding circuit is completed from the secondary 52 through wire 61, contacts 43 and 41, bimetallic element 39, post 40, wire 65, contact 57, switch arm 54, wires 66 and 63, relay coil 53 and wire 64 back to the secondary 52. Completion of this circuit maintains the relay coil 53 energized until the temperature of the block 36 has risen sufficiently high to break contact between contacts 41 and 43. When the contact between contacts 41 and 43 is so broken the relay coil 53 is deenergized to move the switch arms 54, 55 and 56 out of engagement with the contacts 57, 58 and 60 and to move the switch arm 55 into engagement with the contact 59.

Located in one of the spaces to be heated, which space has a temperature corresponding to the average temperature of the building, is a thermostat 68. The thermostat 68 is pivoted to a post 69 and is also provided with a depending arm 70. The depending arm 70 carries contacts 71, 72 and 73 in electrical conducting relation. A contact 74 is also mounted on the depending arm 70 but insulated therefrom by means of an insulating pad 75. The contacts 71, 72, 73 and 74 are adapted to engage with contacts 76, 77, 78 and 79, respectively. The thermostat 68 is provided with an adjusting lever 80 and by moving the lever 80 about the pivot 69 the thermostat 68 is likewise moved. The lever 80 is moved about its pivot 69 by an adjustable cam 81. The adjustable cam 81 is driven through a reduction gear train 82 by a motor rotor 83 upon energization of a field 84. The field 84 is connected by means of wires 85 and 86 to a secondary 87 of a step-down transformer 88. The primary 89 of the transformer 88 is connected by means of wires 90 and 91 to the line wires 46 and 47, respectively. The motor rotor 83 is therefore driven at a constant speed at all times and by reason of the reduction gear train 82 the cam 81 is driven continuously at such a speed that it makes one revolution in each 24 hours in the direction of the arrow. For purposes of illustration, half of the cam 81 is shaded to designated the P. M. portion of the cam and the other half of the cam is left clear to designate the A. M. portion of the cam. Therefore, the cam is shown in a position corresponding to 12 o'clock noon, the lever 80 riding on the low dwell of the cam. At substantially 9 P. M. the lever 80 will ride up on to the high dwell of the cam and at substantially 6 A. M. the lever 80 will ride on to the low dwell of the cam. Therefore, when the lever 80 is resting on the low dwell of the cam 71 the thermostat 68 is adjusted for day operation and when the lever 80 is resting on the high dwell of the cam the thermostat is adjusted for night operation. The contacts are so arranged that the contacts 79 and 74, and the contacts 72 and 77 are normally in engagement and when the temperature rises to a predetermined value the contact 71 engages the contact 76. Likewise, when the temperature lowers below a predetermined value, contact 73 engages the contact 78. For purposes of illustration the contacts 74 and 79 will break upon a rise in temperature above 72 degrees and the contacts 77 and 72 will break upon a decrease in temperature below 69 degrees. By reason of these contact settings these contacts will remain made between the temperatures of 69 degrees and 72 degrees. When the temperature rises above 73 degrees, contact 71 will engage contact 76 and when the temperature decreases below 68 degrees, contact 73 will engage contact 78. These temperature settings are maintained for normal day operation. When the thermostat 68 is adjusted for night operation the temperature settings of the contacts are in effect decreased substantially 10 degrees.

A primary 93 of a step-down transformer 94 is connected by means of wires 95 and 96 to the line wires 46 and 47, respectively. One end of the secondary 97 of the transformer 94 is connected by means of a wire 98 to one end of the field 25. The other end of the field 25 is connected by means of wires 99 and 100 to the contact arm 28. The contact arm 29 is connected by means of a wire 101 to the junction of wires 99 and 100. The contact 30 is connected by means of wires 102 and 103 to the other end of the secondary 97. Wire 104 connects the contact 76 to the junction of the wires 102 and 103. The contact 31 is connected by means of wires 105 and 106 to the contact 78 and the contact 79 is connected by means of a wire 107 to the junction of wires 105 and 106. The contact 32 is connected by means of a wire 108 to the contact 77. The contact 74 which is insulated from the depending arm 70 is connected by means of a wire 109 to the contact 58 of the relay switch. The contact 59 of the relay switch is connected by means of a wire 110 to the post 69 of the thermostat 68. The switch arm 55 of the relay switch is connected by means of a wire 111 to the junction of wires 102, 103 and 104.

The contact 60 of the relay switch is connected by means of a wire 115 to the line wire 46. The switch arm 56 is connected by means of a wire 116 to a variable resistance 117 which in turn is connected to an ammeter 118. A wire 119 connects the ammeter 118 to one end of the heater 45. The other end of the heater 45 is connected by means of a wire 120 to the line wire 47. When the switch arm 56 engages the contact 60, a circuit is completed from the line wire 46 through wire 115, contact 60, switch arm 56, wire 116, variable resistance 117, ammeter 118, wire 119, heater 45 and wire 120 back to the line wire 47. Completion of this circuit causes energization of the heater 45 and consequent heating of the block 36. The variable resistance 117 and the ammeter 118 provide a means for adjusting and visually indicating the amount of heat delivered to the block 36 by the heater 45.

Assume that the valve 16 is closed whereby the contact arm 29 will engage the contact 31, that the temperature within the building is between 69 and 72 degrees whereby contacts 74 and 79 and contacts 72 and 77 will be made, and that the temperature of the block 36 is normal whereby the contacts 42 and 44 and contacts 41 and 43 will be separated. With the parts in such positions, the relay coil 53 is deenergized thereby preventing a supply of heat to the building and to the outdoor controller. When the temperature of the block 36 falls below a predetermined value by the action of the outdoor atmospheric conditions, contacts 41 and 43, and contacts 42 and 44 will make to energize the relay coil 53 in the above described manner. Upon energization of the relay coil 53, switch arm 55 is moved into engagement with contact 58 and switch arm 56 is likewise moved into engagement with contact 60. By reason of this movement a circuit is completed from the secondary 97 of the transformer 94 through wires 103 and 111, switch arm 55, contact 58, wire 109, contacts 74 and 79, wires 107 and 105, contact 31, contact arm 29, wires 101 and 99, field 25 and wire 98 back to the secondary 97 to energize the field 25 and start the valve 16 on its opening movement. After the valve 16 has been started in the opening direction in the above described manner, contact arm 28 engages contact 30 to complete a maintaining circuit from the secondary 97 through wires 103 and 102, contact 30, contact arm 28, wires 100 and 99, field 25 and wire 98 back to the secondary 97. This maintaining circuit remains completed until the valve 16 is moved to its full open position at which time the contact arm 28 moves away from the contact 30 whereby the valve stops in its open position. During this opening movement of the valve 16 the contact arm 29 is moved out of engagement with contact 31 and into engagement with contact 32. In this manner heat is supplied to the building in accordance with outdoor atmospheric conditions.

At the same time that heat is supplied to the building by reason of energization of the relay coil 53, heat is also supplied to the outdoor controller by engagement of the switch arm 56 with the contact 60. The amount of heat delivered to the building and the controller bears a relation to the amount of heat losses from the building and from the controller. By reason of this proportion the average temperature within the outdoor controller 35 is definitely related to the average temperature within the building so that the thermostatic element 39 which responds to the temperature within the outdoor controller forms an accurate and efficient controller of the temperature within the building.

When the temperature within the controller 35 has risen above a predetermined value under the action of the heater 45, contact between the contacts 41 and 43 is broken to cause deenergization of the relay coil 53 whereby the switch arm 55 is moved into engagement with the contact 59 and the switch arm 56 is moved out of engagement with the contact 60. When the switch arm 55 engages the contact 59, a circuit is completed from the secondary 97 through wires 103 and 111, switch arm 55, contact 59, wire 110, post 69, thermostat 68, depending arm 70, contact 72, contact 77, wire 108, contact 32, contact arm 29, wires 101 and 99, field 25 and wire 98 back to the secondary 97 to energize the field 25 to start the valve 16 towards its closed position. After the valve 16 has started its closing operation, maintaining circuit is completed from the secondary 97 through wires 103 and 102, contact 30, contact arm 28, wires 100 and 99, field 25 and wire 98 back to the secondary 97. When the valve 16 has been completely closed, this maintaining circuit is broken and the contact arm 29 is moved into engagement with the contact 31 to position the valve motor for opening operation. When the valve 16 is thus closed, preventing the supply of heat to the building, the supply of heat to the outside controller 35 is also prevented. The building and the outdoor controller are then allowed to cool according to their heat losses and when the temperature within the outdoor controller has decreased below a predetermined value, heat will then be supplied to the building and to the outdoor controller in proportionate amounts in the manner pointed out above. By reason of this, the temperature within the building is maintained at a substantially constant normal value regardless of the outdoor atmospheric conditions.

If for some reason the temperature within the building should rise above the normal temperature range to be maintained within the building, say above 73°, contact 71 is moved into engagement with contact 76 to complete a circuit from the secondary 97 through wires 103 and 104, contacts 76 and 71, depending arm 70, contacts 72 and 77, wire 108, contact 32, contact arm 29, wires 101 and 99, field 25, and wire 98 back to the secondary 97 to energize the field 25 to move the valve 16 to the closed position. In this manner if the building temperature should become excessive the supply of heating fluid to the building is shut off regardless of the condition of the outdoor controller. This affords a high limit temperature control for the building. When the temperature within the building has decreased due to the shutting off action of the thermostat 68 and if the outdoor controller 35 is still calling for heat, the valve 16 will again be opened to supply heat to the building in the manner pointed out above.

In a like manner if the outdoor controller is not calling for heat and the valve 16 is closed and the temperature within the building should fall below a predetermined value, say 68°, contact 73 is moved into engagement with the contact 78 to complete a circuit from the secondary 97 through wires 103 and 111, switch arm 55, contact 59, wire 110, post 69, thermostat 68, depending arm 70, contacts 73 and 78, wires 106 and 105, contact 31, contact arm 29, wires 101 and 99, field 25 and wire 98 back to the secondary 97 to energize the field 25 to move the valve 16 to an open position. Heat is thus supplied to the building when the temperature within the building falls below a predetermined value even though the outdoor controller has been satisfied. This affords a low limit temperature control for the building. When the temperature within the building has been increased due to the action of the thermostat 68 to a value, say 69°, contact 72 engages contact 77 to move the valve 16 to a closed position if the outdoor controller 35 still remains satisfied.

From the above it is seen that I have provided a system for controlling the temperature within a building, utilizing an outdoor controller wherein the outdoor controller controls the temperature of the building when the temperature of the building remains within predetermined limits illustrated as 69° and 72°. If, for some reason, the temperature within the building should rise above the upper limit of the range, to 73° as illustrated, heat is cut off from the building regardless of the condition of the outdoor controller and likewise when the temperature of the building decreases to a value below the normal temperature range, to 68° as illustrated, the valve 16 is moved to open position even though the outdoor controller is not calling for heat. In effect this invention affords a means for maintaining the temperature within a building within a predetermined range in accordance to outdoor atmospheric conditions and also affords a high limit and a low limit control to maintain the temperature of the building within this range if the temperature of the building attempts to wander out of this range.

During the night, the effective setting of the inside thermostat 68 is lowered to maintain a temperature within the building within a predetermined range of, say 58° to 63°. The outdoor controller cycles back and forth at night in identically the same manner as it does at day. However, since the amount of heat delivered to the outdoor controller is proportioned with respect to the heat supplied to the building to maintain the temperature within the building at a normal day value the outdoor controller will not control the temperature within the building at night. Therefore, the primary control for night operation is the inside thermostat 68 and not the outdoor controller 35. Thus, the temperature at night is maintained within the predetermined limits which are for purposes of illustration substantially 58° and 63°.

In the morning at substantially 6 o'clock the thermostat 68 is adjusted from its night setting to its day setting and since the temperature within the building is at that time below 68°, the contact 73 will remain in engagement with the contact 78 to open the valve 16, to supply heat to the building regardless of the condition of the outdoor controller 35. Heat will be continually supplied to the building under the control of the thermostat 68 until the building temperature has risen to 69° at which time contacts 77 and 72 and contacts 74 and 79 will be made to place the control of the heating system of the building under the outdoor controller 35. The heating system of the building will remain under the control of the outdoor controller 35 throughout the day and will cycle back and forth in the manner described until the thermostat 68 is adjusted to its night setting, which time has been illustrated as 9 o'clock in the evening.

From the above it is seen that I have also provided along with the high and low limit functions of the thermostat, a night control function to maintain the temperature of the building within a predetermined range at night, a morning pickup function whereby the temperature within the building is raised from the night value to the day value and an automatic change over function whereby the control of the building heating system is automatically transferred from the inside thermostat to the outdoor controller 35 when the building temperature has reached the day value. The system of this invention therefore is entirely automatic and does not require the use of time switches and the related mechanisms for shifting the control from the inside thermostat to the outdoor controller.

Although I have disclosed one specific form of this invention, other forms and modifications may become apparent to those skilled in the art and therefore my invention is to be limited only by the scope of the appended claims and prior art.

I claim as my invention:

1. In a system of the class described, temperature changing means for a building, an outdoor controller, temperature changing means for the outdoor controller, means responsive to the temperature of the outdoor controller for controlling both temperature changing means to maintain the building temperature at normal, means responsive to the temperature of the building for controlling the building temperature changing means to maintain the building temperature other than normal, and means for adjusting said building temperature responsive means to restore the building temperature to normal.

2. In a system of the class described, in combination temperature changing means for a building, an outdoor controller, an indoor controller, connections between each of said controllers and the temperature changing means, the connections between the outdoor controller and said temperature changing means including means actuated by said indoor controller, said indoor controller being arranged to actuate said last mentioned means and to operate said temperature changing means to maintain the indoor temperature between predetermined limits regardless of the action of said outdoor controller and to place said outdoor controller in control of said temperature changing means when the indoor temperature is within such limits, and means for periodically raising and lowering the control point of said indoor controller to maintain different temperatures within the building for different periods of operation.

3. In a system of the class described, in combination, means for changing the temperature of a building, an outdoor controller, an indoor controller, electrical connections between the indoor controller and the temperature changing means for causing said indoor controller to maintain the indoor temperature between predetermined limits regardless of said outdoor controller, electrical connections between said outdoor controller and said temperature changing means, said connections including a switch controlled by said indoor controller for placing said outdoor controller in control of said temperature changing means when the indoor temperature is within said limits, and means for periodically raising and lowering the control point of said indoor controller to maintain different temperatures within the building for different periods of operation.

4. In a system of the class described, in combination, means for changing the temperature of a building, an outdoor controller, an indoor controller, electrical connections between said outdoor controller and said temperature changing means, said connections including a switch controlled by said indoor controller, said indoor controller being arranged to place said outdoor controller out of controlling relationship with said temperature changing means whenever the indoor temperature varies from predetermined limits and to place said outdoor controller in control of said temperature changing means when the indoor temperature is within such limits, and means for periodically adjusting said indoor controller to change the value of said predetermined limits.

5. In a system of the class described, in combination, means for changing the temperature of a building, an outdoor controller, an indoor controller, electrical connections between each of said controllers and said temperature changing means, the connections between the outdoor controller and said temperature changing means including a switch controlled by said indoor controller, said indoor controller being arranged to assume control of said temperature changing means and to place said outdoor controller out of operative relationship with said temperature changing means whenever the indoor temperature varies from predetermined limits, and to place said outdoor controller in control of said temperature changing means when the indoor temperature is within said predetermined limits, and means for periodically varying the adjustment of said indoor controller for maintaining different temperatures within the building for different periods of operation.

6. In a system of the class described, temperature changing means for a building, an outdoor controller, timing means for connecting said outdoor controller in operative relationship with said temperature changing means during one period of time to maintain a normal temperature within the building during such period, and for disconnecting said outdoor controller from operative relationship with said temperature changing means during another period of time, said timing means including an inside temperature actuated control means, and connections between said control means and said temperature changing means to maintain the inside temperature within predetermined limits during each period of time.

7. In a system of the class described, temperature changing means for a building, an outdoor controller, timing means for connecting said outdoor controller in operative relationship with said temperature changing means during one period of time to maintain a normal temperature within the building during such period, and for disconnecting said outdoor controller from operative relationship with said temperature changing means during another period of time, said timing means including an inside temperature actuated control means, and connections between said control means and temperature changing means to maintain the inside temperature at a predetermined value during one of said periods of time.

8. In a system of the class described, in combination, means for changing the temperature of a building, an outdoor controller, an indoor controller, electrical connecting means between said outdoor controller and said temperature changing means including switching means controlled by said indoor controller, said switching means being arranged selectively to place said outdoor controller into or out of control of said temperature changing means, said indoor controller being arranged to actuate said switching means in accordance with variations in temperature at said indoor controller, and means for periodically raising and lowering the setting of said indoor controller.

9. In a system of the class described, in combination, means for changing the temperature of a building, an outdoor controller, an indoor controller, electrical connecting means between said outdoor controller and said temperature changing means including current varying means controlled by said indoor controller, said current varying means being arranged to vary the relationship between said outdoor controller and said temperature changing means for varying the action of said temperature changing means, said indoor controller being arranged to cause actuation of said current varying means in accordance with changes in temperature at said indoor controller, and means for periodically raising and lowering the setting of said indoor controller.

JOHN P. KRIECHBAUM.